United States Patent [19]
Ennis et al.

[11] Patent Number: 5,566,923
[45] Date of Patent: Oct. 22, 1996

[54] FLUID VALVES

[75] Inventors: Dan O. Ennis, Sandy; Robert E. Gooch, Orem; Stephen R. Chipman; Jonathan D. Nelson, both of Provo, all of Utah

[73] Assignee: Valtek, Inc.

[21] Appl. No.: 384,707

[22] Filed: Feb. 6, 1995

Related U.S. Application Data

[63] Continuation-in-part of Ser. No. 80,281, Jun. 21, 1993, Pat. No. 5,386,967.
[51] Int. Cl.$^6$ ........................................ F16K 5/06
[52] U.S. Cl. ................... 251/315.04; 251/315.16
[58] Field of Search ............... 251/304, 315.04, 251/315.16

*Primary Examiner*—John C. Fox
*Attorney, Agent, or Firm*—Thorpe North & Western

[57] ABSTRACT

A coupling for use in a rotary ball valve having a spherical ball with a passageway therethrough for controlling the flow of fluid through the valve. The coupling is particularly suited for use with non-metallic, for example, ceramic, spherical balls which are rotated by torque applied to a metallic actuator shaft. The coupling includes a plurality of depressions and protrusions formed at the interface of the non-metallic and metallic components. The depressions and protrusions are positioned away from the central axis of the spherical ball. A cushion can be interposed between the metallic and non-metallic components to further disperse the force applied to the non-metallic component. The depression and protrusions can be tapered and oriented at an angle with respect to the central axis so that as torque is applied to the shaft the non-metallic component is rotated without breakage thereof.

10 Claims, 15 Drawing Sheets 5,566,923

FLUID VALVES

RELATED APPLICATIONS

This application is a continuation-in-part of U.S. patent application Ser. No. 08/080,281 filed Jun. 21, 1993 entitled Ball Valve Coupling, now U.S. Pat. No. 5,386,967.

BACKGROUND

1. The Field of the Invention

This invention relates to valves used to control the flow of fluids. More particularly, the present invention relates to valves used to control the flow of erosive or corrosive fluids.

2. The Background Art

Valves of various types are crucial components in many industrial process and fluid transportation systems. In many instances, a valve will be required to handle an erosive, corrosive, or other fluid or slurry which is incompatible with metallic components. In order to handle such fluids, it is often necessary to line pipes and other components which come in contact with the fluid with materials such as plastic or ceramic materials.

Valves which come into contact with erosive or corrosive fluids present particular problems. Since the components of the valve must move to control the fluid flow, it is a particular challenge to make a valve which can carry out its fluid flow control functions while being fabricated from a material which is compatible with the fluid.

In particular, valves which control the flow of erosive or corrosive fluids require that liners, seats, plugs, balls, and other wetted parts, be made of compatible, i.e., non-metallic, materials. The problems which have hindered the use of non-metallic wetted parts often arise because of the weakness of the non-metallic components in the valve. In particular, the interface between the metallic actuator components and the non-metallic flow controlling element often presents problems.

For example, a rotary ball valve includes a rotating spherical ball, provided with a cylindrical passageway therethrough, which acts as a flow control element in cooperation with a conical seat formed in the valve body. A shaft or stem connects the spherical ball element, through appropriate seals, to an external actuator. The stem transmits the force necessary to turn the spherical ball to control the flow of fluid through the valve.

FIG. 1 is a diagrammatic representation of one such rotary ball valve as is known in the art. The valve represented in FIG. 1 includes valve housing components 14 and shaft 20, The rotation of the shaft 20 controls the flow of fluid through the valve. The valve housing components 14 and the shaft 20 can be fabricated from steel or other material known in the art. The valve housing components 14 and the shaft 20 do not come into regular contact with the fluid and thus can be fabricated from conventional materials.

A seating assembly 12 is fabricated from a material which is compatible with the fluid, for example, a ceramic material. A spherical ball element 10 is positioned within the seating assembly. The spherical ball element 10 is also fabricated from a material which is compatible with the fluid, for example, a ceramic material. The spherical ball element 10 is provided with a passageway, shown by the dashed line at 16, through which the fluid passes when the valve is in the open position as illustrated in FIG. 1.

When fluid is impinging upon the valve in the direction of arrow F, dynamic forces caused by the flow of the fluid through the valve, and static forces developed when the valve is shut off, as well as the differential pressures which are generated, forces the spherical ball element 10 against the seating assembly 12. The spherical ball element 10 and the seating assembly 12 together form a sealing relationship at the location represented at 18 (which has been represented in a slightly exploded configuration to show the pertinent structures).

In addition to the forces just described, frictional forces are created by the contact of the spherical ball element 10 and the seating assembly 12. Additional forces are also created from contact of the spherical ball element 10 with residual material deposited from the fluid in contact with the spherical ball element 10. In particular, high frictional forces can develop when an abrasive material is included in the fluid, e.g., a slurry, coming in contact with the valve. The abrasive material can become trapped between the sealing interface 18 between the spherical ball element 10 and the seating assembly 12 in sufficient quantity to encapsulate the spherical ball element 10. All of these described conditions require that additional torque be applied to rotate the spherical ball element 10.

When non-metallic materials are used for the spherical ball element 10, for example a ceramic material, high compression strength to provide erosion resistance is often provided, but, disadvantageously, such materials often exhibit low toughness and tensile strength. Most disadvantageously, in the previously available devices, the interface between the steel shaft 20 and the spherical ball element 10 is prone to fracture and failure during application of the high torque needed to overcome the conditions described earlier and operate the valve.

As illustrated in FIG. 1, a key 22 formed on the end of the shaft 20 which is received into a corresponding key way formed on the central axis of the spherical ball element 10 is the general structure used in the prior devices to interface the two components. Alternatively, some prior devices utilize a hexagonal shaped key. The torque applied to turn the shaft 20 and the spherical ball element 10 during operation of valve can cause the fracture of the spherical ball element 10 resulting in failure of the valve.

In view of the forgoing, it would be an advance in the art to provide a more reliable valve utilizing a non-metallic spherical ball element which is less prone to fracture and breakage.

BRIEF SUMMARY AND OBJECTS OF THE INVENTION

In view of the above described state of the art, the present invention seeks to realize the following objects and advantages.

It is a primary object of the present invention to provide a more reliable fluid valve wherein a non-metallic flow control element is used.

It is also an object of the present invention to provide a fluid valve wherein the interface between the wetted non-metallic components and the non-wetted metallic components more reliably transmits the force applied to operate the valve.

It is a further object of the present invention to provide a coupling between the flow control element of the valve and the actuation structures of the valve which will avoid breakage, fractures, and deformation of the flow control element.

It is an additional object of the present invention to provide a coupling between a ceramic flow control element used in a fluid valve and the actuation structures of the valve which avoids fracture or breakage of the flow control element when force is applied to operate the valve.

It is another object of the present invention to provide a valve for use with corrosive and erosive fluids wherein the metallic components of the valve are sealed from the fluid passing therethrough.

These and other objects and advantages of the invention will become more fully apparent from the description and claims which follow, or may be learned by the practice of the invention.

The present invention provides a coupling between a flow control element and an actuation shaft in a fluid control valve. As the actuation shaft rotates, the flow control element is rotated and it controls the flow of fluid through the valve. The flow control element is preferably a non-metallic, e.g., ceramic, spherical ball having a passageway therethrough. The ceramic or other non-metallic material should be compatible with any erosive or corrosive fluid flowing through the valve.

The coupling of the present invention functions to transmit the force applied to the actuation shaft to the fluid control element which, without the structures of the present invention, would be prone to fracture, breakage, or deformation. The coupling provides an interface between the dissimilar materials (e.g., ceramic and steel) of the actuation shaft and the fluid control element.

The coupling includes a plurality of sockets on the flow control element and a plurality of corresponding fingers. The fingers are coupled to the actuation shaft or stem of the valve. The fingers are received into the sockets and hold the flow control element in a fixed relationship such that as the actuation shaft or stem is rotated the flow control element also rotates.

In accordance with another aspect of the present invention, the sockets can be tapered from their opening to their bottom to further reduce breakage and fracture. The fingers are provided with a corresponding taper. The sockets and fingers are also preferably oriented at an angle in relationship to the central axis of the flow control element so that the bottom of the sockets are farther from the central axis than the openings of the sockets. It is also preferred that the sockets be arranged asymmetrically about the central axis. Each of these features provide a coupling which is more reliable and less prone to fracture and breakage than that available in the prior art.

A cushion means is also preferably interposed between the sockets and the fingers at the coupling interface. The cushion means preferably comprises a resilient or compliant material which functions to further distribute the force applied by the actuation shaft.

In accordance with yet another aspect of the present invention, the metallic actuation stem does not extend all the way to the ceramic flow control element but a ceramic stem extension couples the metallic stem to the ceramic flow control element to ensure that the metallic stem is not exposed to the fluid flowing through the valve. A seal is provided to prevent the metallic stem from coming into contact with the corrosive or erosive fluid flowing through the valve.

All of the sockets and fingers are positioned away from the central axis of the fluid control element to reduce the force applied at the ceramic/metal interface for a given torque applied to the actuation stem. Preferably, the sockets and fingers are positioned at a location not closer to the central axis than ten percent of the distance from the central axis to the perimeter of the fluid control element. More preferably, these structures are positioned at a location in the range from ten percent to ninety percent of distance from the central axis to the perimeter of the fluid control element. Locating the sockets away from the central axis allows torque to be applied to the actuation shaft and to the flow control element without breakage thereof.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 2:
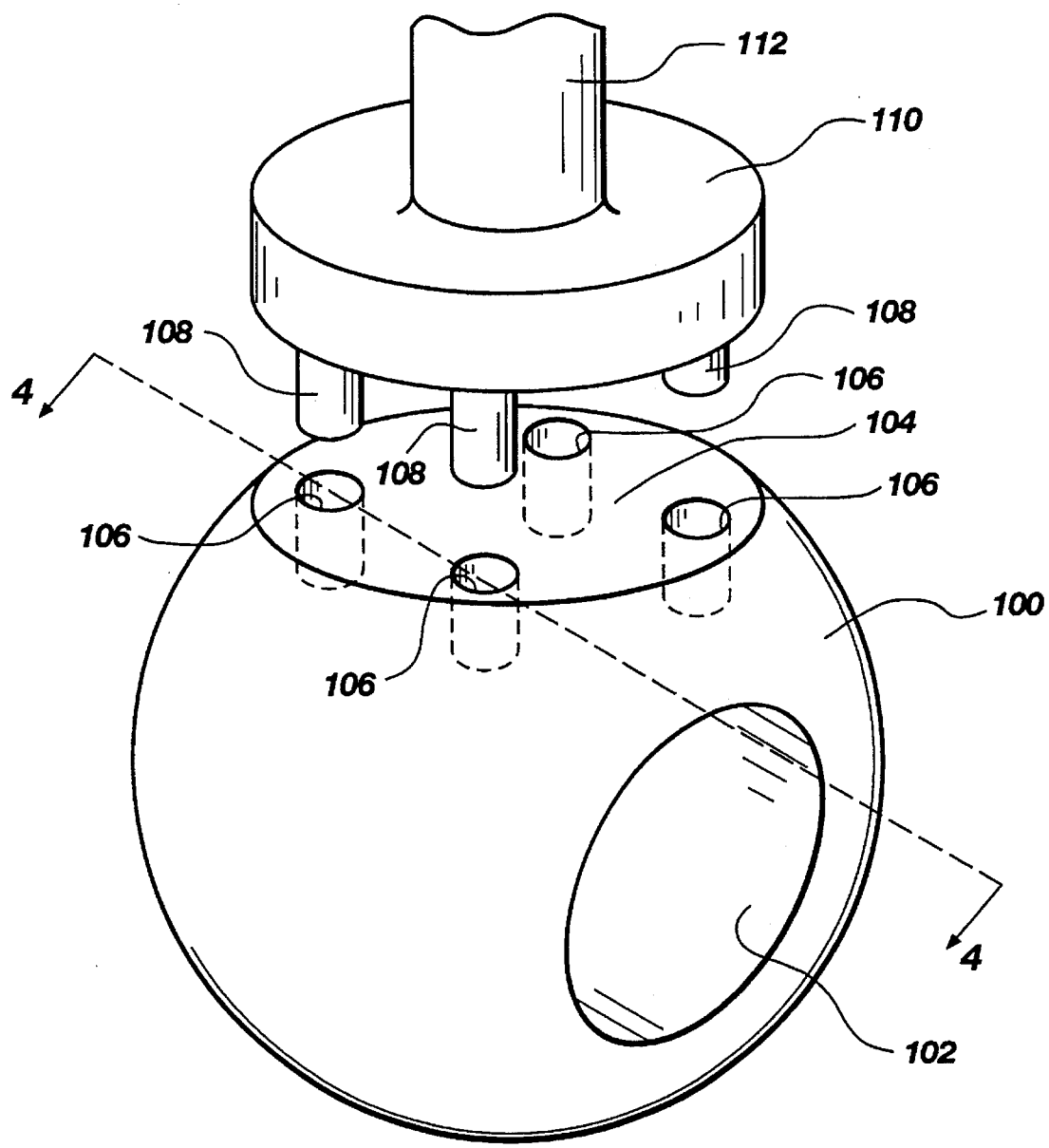
FIG. 2 is a perspective view of a first presently preferred embodiment of the present invention.

As discussed earlier, it is necessary in many instances to fabricate wetted components of a valve with non-metallic materials which are compatible with the fluid flowing through the valve. In FIG. 2, a flow control element 100 is represented. The flow control element 100 is preferably fabricated from a ceramic material. Other materials, generally non-metallic materials but metallic materials are also contemplated, can also be used within the scope of the present invention as are now known or will become known in the future.

Figure 1:
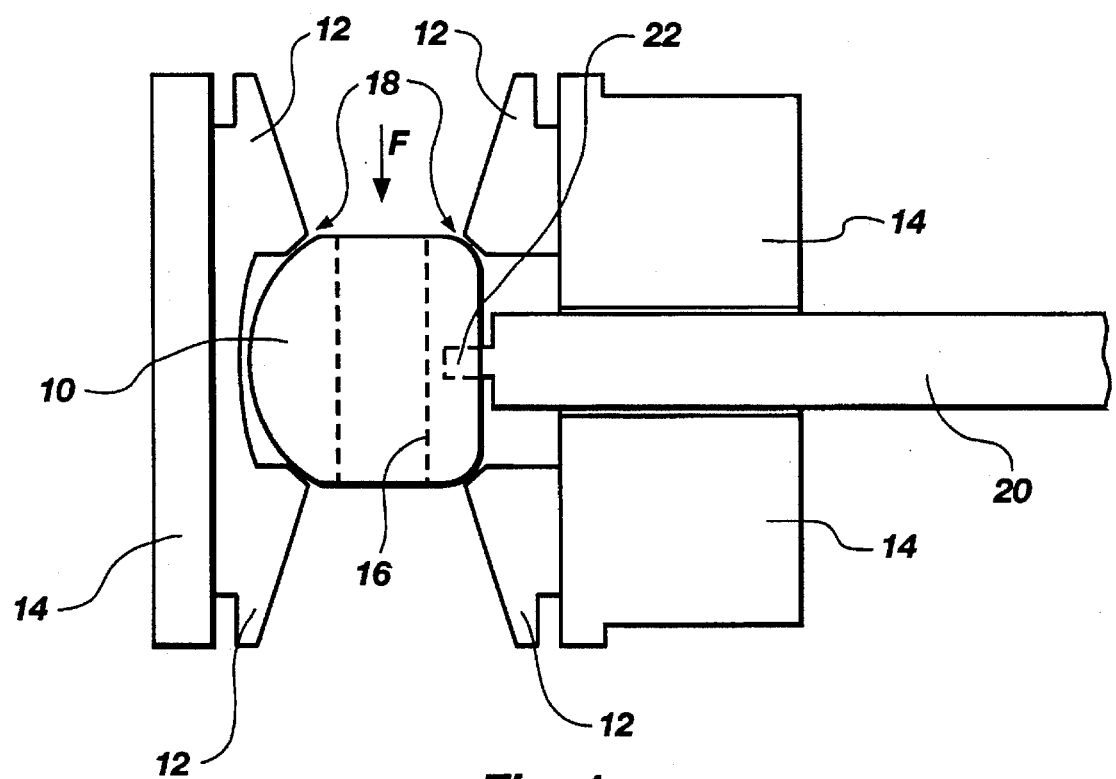
FIG. 1 is a diagrammatic representation of a previously available valve including a non-metallic spherical ball element.

The illustrated flow control element 100 represented in FIG. 2 is shaped as a generally spherical ball and can be used in a valve generally arranged as the valve represented in FIG. 1. While the flow control elements described herein are shaped as a spherical ball, other shapes can also be used within the scope of the present invention. The flow control element 100 includes two openings which are connected by a passageway 102 through which fluid flows when the valve is open.

In order to overcome the problems of breakage at the interface of the steel shaft (20 in FIG. 1) with the flow control element (10 in FIG. 1), which have hitherto been accepted as inevitable in the art, the structures represented in FIGS. 2–14 are provided. The prior art arrangements produce undue stresses concentrated in a small surface area on the spherical ball element which results in breakage and fracture.

The present invention utilizes a plurality of fingers 108 which engage a corresponding plurality of sockets 106. In the embodiment illustrated in FIGS. 2–4, the flow control element 100 is provided with a flat surface 104. The fingers 108 are formed on a coupling plate 110. A shaft 112 is connected to the coupling plate 110. The plurality of fingers 108 and their corresponding sockets 106 provide that the torque which is exerted on the shaft 112 to operate the valve is distributed to a plurality of locations and over a relatively large surface area on the flow control element 100.

The four fingers 108 and the corresponding four sockets 106 represented in FIG. 2 are presently preferred. Other numbers of equivalent structures can also be used within the scope of the present invention. For example, the numbers of fingers 108 and sockets 106 can be two, three, four, or more.

Figure 3:
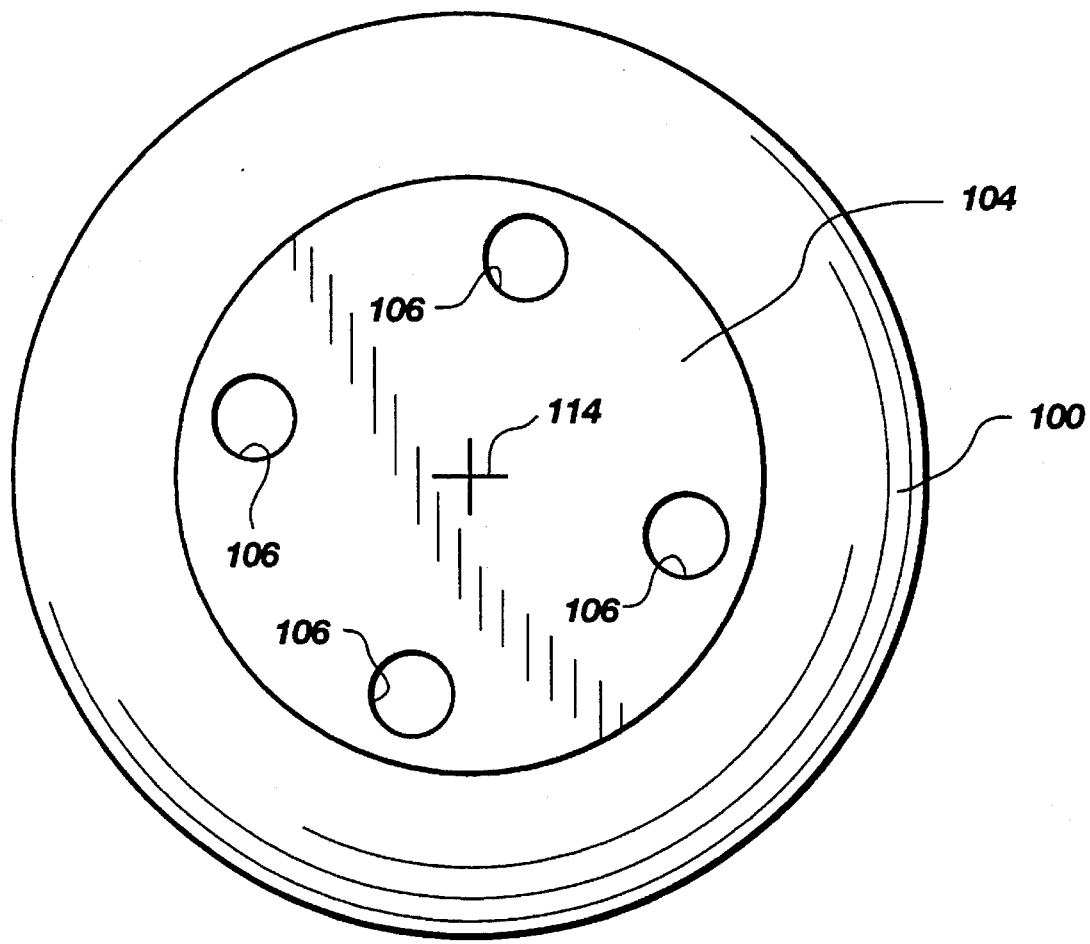
FIG. 3 is a top plan view of the flow control element of the first presently preferred embodiment represented in FIG. 2.

FIG. 3 provides a top plan view of the flow control element 100 represented in FIG. 2. In accordance with the present invention, it is desirable to move the sockets 106 away from the central axis of the flow control element 100. The central axis of the flow control element 100 is indicated at 114. The central axis is the axis about which the flow control element rotates. By positioning the sockets 106 away from the central axis 114 and toward the circumference or perimeter of the flow control element, the applied forces are not concentrated upon a small area or points in the flow control element 100 and thus the likelihood of fracture or breakage is reduced.

It will be appreciated that the position of the sockets 106 and their corresponding fingers 108 can be altered in accordance with the intended application of the finished valve. In instances where little torque is applied to the shaft 112 during operation of the valve, the sockets 106 may be placed closer to the central axis 114, for example, not closer than a range from about ten percent to about thirty percent of the distance from the central axis 114 to the perimeter of the flow control element 100. Alternatively, the sockets 106 may be placed farther from the central axis 114, for example, from about thirty percent to about eighty percent of the distance from the central axis 114 to the perimeter of the flow control element. In the case of a non-spherical flow control element 100, those skilled in the art will also be able to determine the appropriate position for the sockets depending upon the application of the valve.

The illustrated fingers 108 and sockets 106 are merely one presently preferred example of interengaging structures which can be used within the scope of the present invention. Other structures, both those described herein and all equivalent structures thereof, can function within the scope of the present invention. Moreover, it will be appreciated that it is within the scope of the present invention to reverse the orientation of the fingers and socket structures, e.g., place the protrusions on the non-metallic component and the corresponding depressions on the metallic component, but those skilled in the art will appreciate the limited applications in which such an arrangement would be appropriate.

Figure 4:
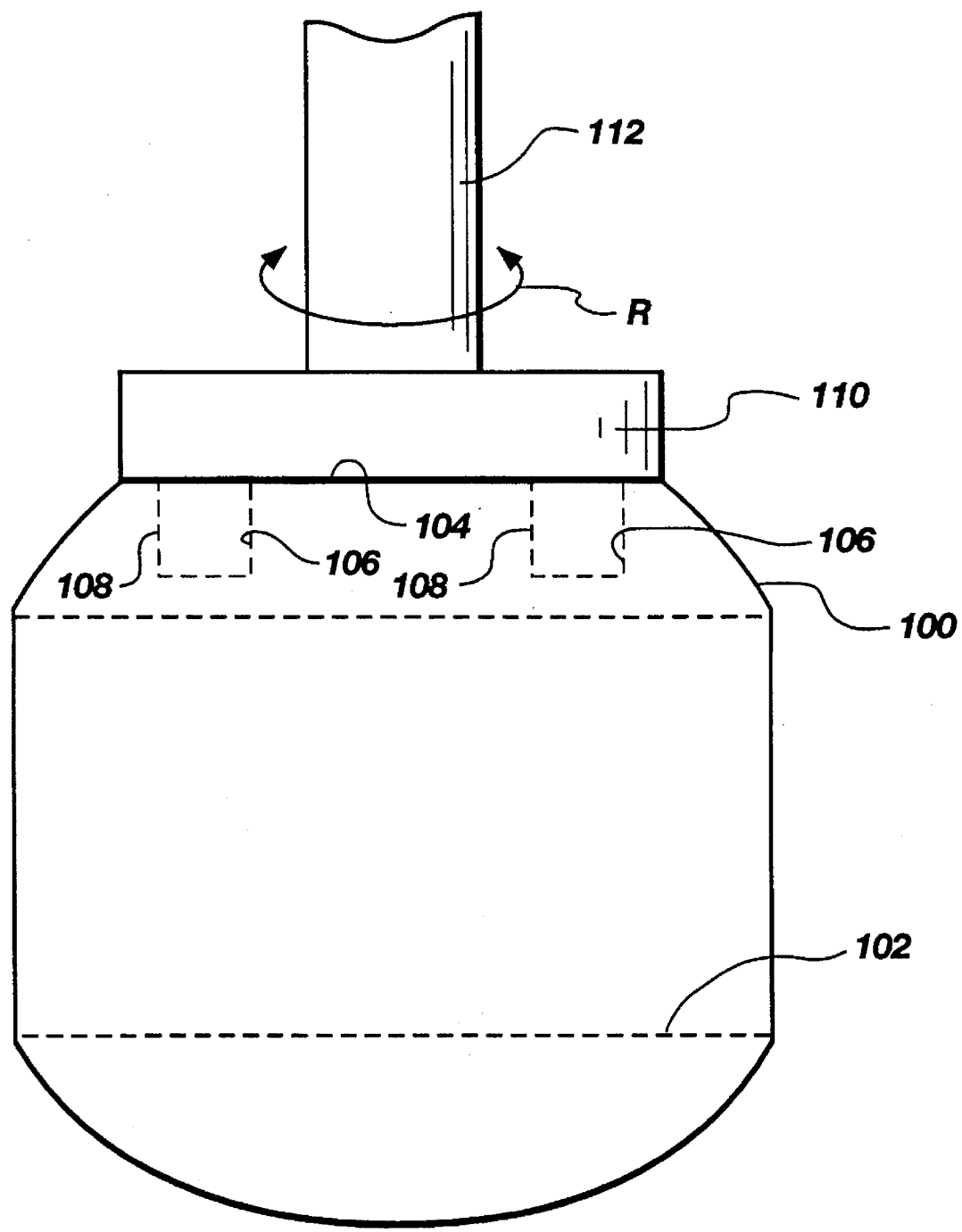
FIG. 4 is a cross sectional view of the flow control element of the first presently preferred embodiment taken along line 4—4 in FIG. 2.

FIG. 4 provides a cross sectional view of the flow control element of the first presently preferred embodiment taken along line 4—4 in FIG. 2. In FIG. 4, the fingers 108 are shown inserted into the sockets 106. The coupling plate 110 preferably fits against the flat surface 104 and the fingers 108 preferably fit tightly into the sockets 106. The described arrangement provides that the torque needed to turn the flow control element 100 in the directions indicated by the arrow R is distributed over much more surface area in than the prior arrangement represented in FIG. 1. As will be appreciated by those skilled in the art, the coupling plate 110 and the fingers 108 are fixed to the flow control element 100 by pressure, friction, or by an adhesive.

Figure 5:
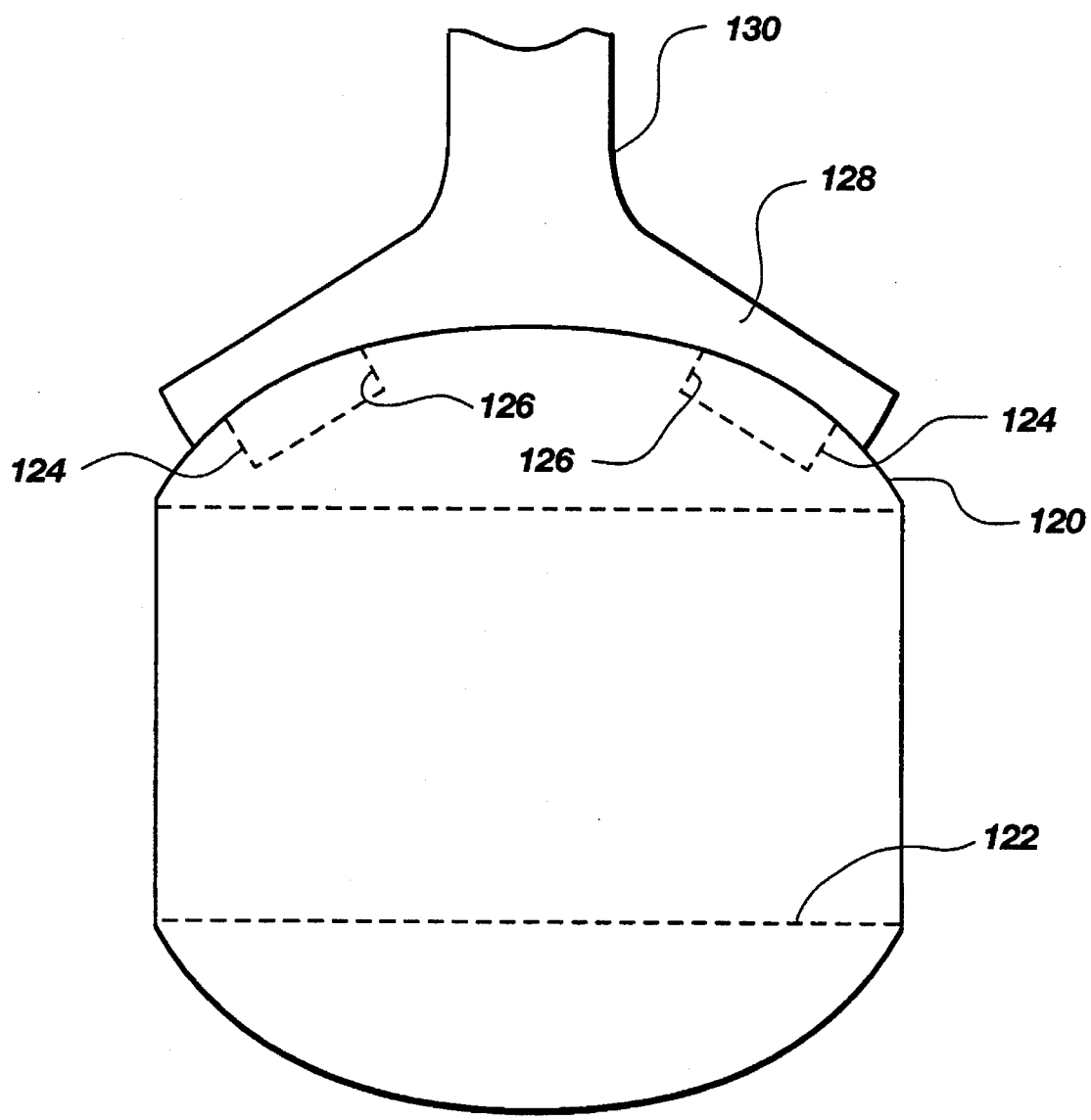
FIG. 5 is a cross sectional view of the flow control element of a second presently preferred embodiment of the present invention.

Another preferred embodiment of the present invention is illustrated in the side view of FIG. 5. In FIG. 5 a flow control element 120 is illustrated which functions essentially similarly to the flow control element 100 represented in FIGS. 2–4. A passageway 122 is provided through the flow control element 120.

A shaft 130 is attached to a curved coupling plate 128. The lower surface of the curved coupling plate 128 matches the shape of the upper surface of the flow control element 120. Rectangular fingers 124 fit into correspondingly shaped rectangular sockets 126. The rectangular fingers 124 and rectangular sockets 126 function essentially similarly to the fingers 108 and sockets 106 represented in FIGS. 2–4.

Figure 6:
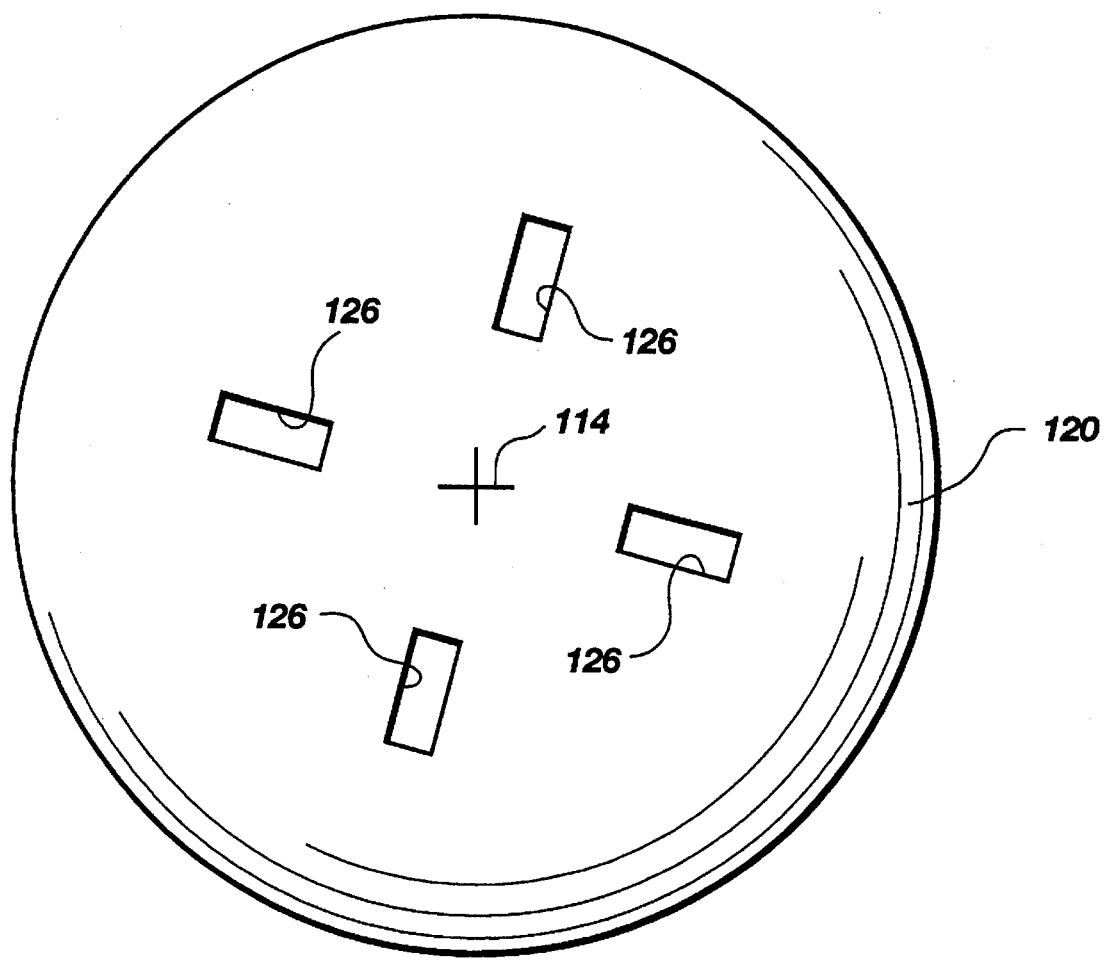
FIG. 6 is a top plan view of the flow control element of the second presently preferred embodiment represented in FIG. 5.

FIG. 6 is a top plan view of the flow control element 120 with the rectangular sockets 126. As will now be appreciated, the fingers and their corresponding sockets can be fabricated in many different shapes and assume many different placements on the flow control element.

Figure 7:
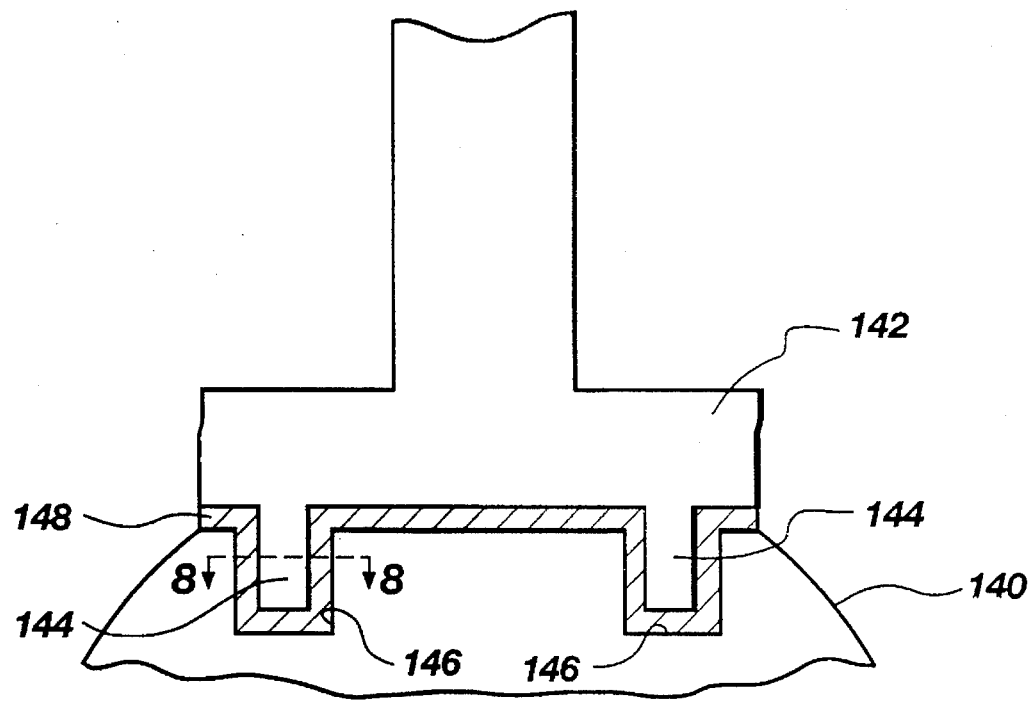
FIG. 7 is a cross sectional view of the flow control element of a third embodiment of the present invention.
Figure 8:
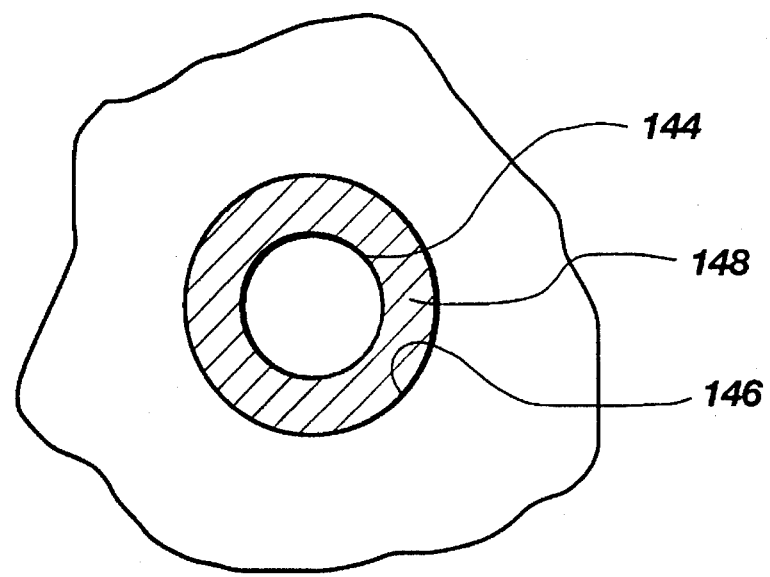
FIG. 8 is a cross sectional view taken along line 8—8 of FIG. 7.

Reference will now be made to FIGS. 7 and 8 which are cross sectional views of another preferred embodiment of the present invention. In FIGS. 7 and 8 a flow control element is represented at 140. Two cylindrically shaped fingers 144 and two correspondingly shaped sockets 146 are also represented as protruding from a coupling plate 142.

As will now be appreciated, it is desirable to spread the force which is necessary to rotate the flow control element over as much surface area as possible and to avoid point contacts which might cause fractures and breakage of the flow control element. In order to further improve the operation of the present invention, a cushion 146 can be interposed between the fingers 144, the flow control element 140, and the coupling plate 142. It will be understood that the cushion is most desirably positioned between the surfaces which transmit and receive the force generated when operating the valve. Thus, as can be determined by one skilled in the art, the cushion can have a shape and position different than that represented herein.

The cushion 148 is preferably a resilient and compliant material such as a rubber-like material. Other materials can also be used within the scope of the present invention. For example, a silicon gel which cures and hardens can be interposed between the pertinent structures during assembly. Furthermore, the resilient material can be relatively hard and/or thin and still provide the desirable function.

FIG. 8 shows how the finger 144 is surrounded by the cushion 148 so that as force is applied to the finger 144 it is transmitted by the cushion 148 which is held captive against the wall of the socket 146. Use of the cushion 148 is particularly desirable where the dimensional tolerances of the fingers 144 and the sockets 146 are such that an uniform fit may not occur in every instance. In such instances, the cushion 148 avoids the fractures, breakage, or deformation which can occur when force is concentrated in a small area. The cushion 148 can be adapted for use with numerous embodiments of the present invention as determined using the teachings set forth herein. Furthermore, the described cushion 148 is exemplary of the structures which can function as the cushion means of the present invention and other structures equivalent thereto can also be used.

Figure 9A:
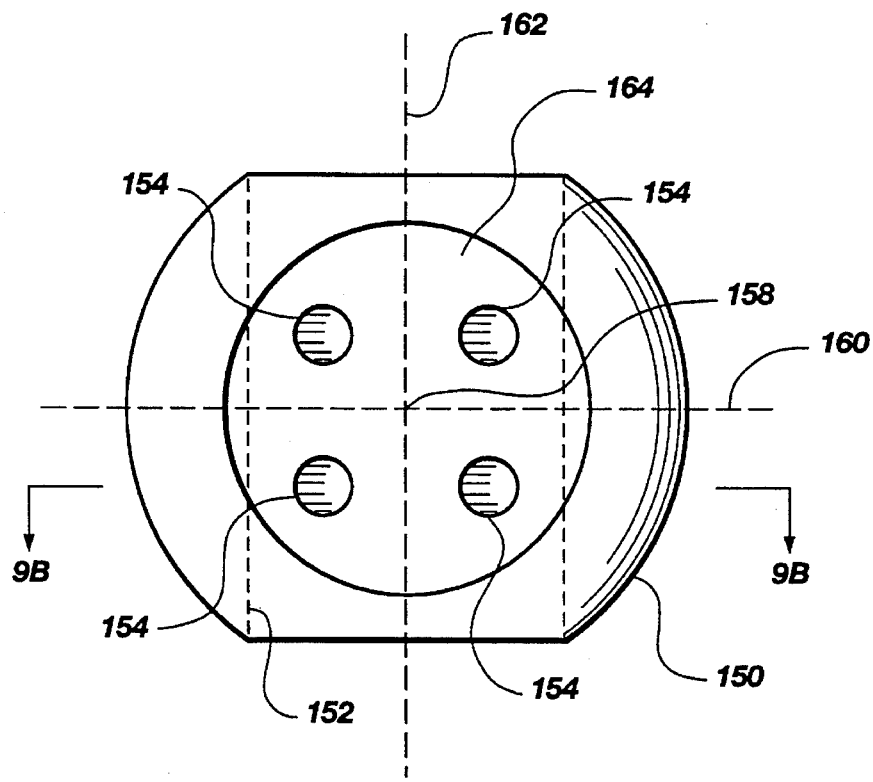
FIGS. 9A and 9B are top and cross sectional views, respectively, of another presently preferred flow control element of the present invention.
Figure 9B:
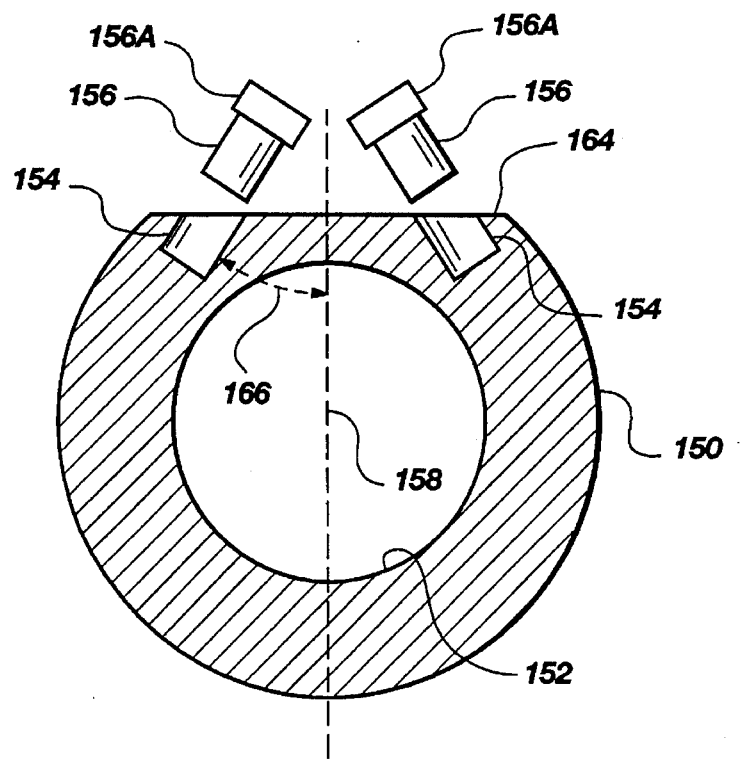

FIGS. 9A–B provide top and cross sectional views, respectively, of another coupling arrangement for a flow control element 150 of the present invention. A passageway 152 through the flow control element 150 is represented by the broken lines provided in FIG. 9A and is also shown in the cross sectional view of FIG. 9B. The top view of FIG. 9A shows a flat surface 164 presenting the openings of four sockets 154 which extend downwardly into the mass of the flow control element 150.

The sockets 154 are asymmetrically placed about the central axis of the flow control element 150, the rotational central being designated 158. The asymmetrical placement of the four sockets 154, that is, the sockets 154 not being equally spaced from both of the axes represented by dashed lines 160 and 162, moves the sockets 154 (in contrast to symmetrical placement) where significant mass exists and away from the spherical surface of the flow control element 150. The proper asymmetrical positioning of the sockets 154 provides resistance against fracture and breakage due to torsional loading.

FIG. 9B provides a cross sectional view of the flow control element 150 taken along line 9B—9B of FIG. 9A. As seen in FIG. 9B, the sockets 154 are oriented at an angle in relation to the rotational axis 158. Corresponding fingers 156 are shown in a position ready to be inserted into their respective sockets 154. The fingers 156 include a threaded portion 156A by which the fingers 156 can be attached to a coupling plate (not illustrated in FIGS. 9A–B) or to other similar or equivalent structures.

By orienting the sockets 154 at an angle with respect to the rotational axis 158, the sockets 154 are positioned away from the surfaces of the flow control element 150. With the sockets 154 bring oriented as shown in FIG. 9B, the fingers 156, when inserted therein, engage significant material of the flow control elements 150 with minimal deflection and maximal distance between the wall of the socket 154 and the free surfaces (either inner or outer) of the flow control element 150. This arrangement allows higher rotational forces to be applied without fracture or failure resulting.

The angle at which the sockets 154 are oriented is represented by angle 166. The angle 166 of the sockets can be selected in accordance with the particular dimensions of the flow control element 150 and the application of the accompanying valve. The preferred range for the angle 166 when used with the embodiments represented herein is from about 0° to about 60°. The angles of the sockets 154 may all be the same or each angle may be different. The structures represented in FIGS. 9A–B allow greater force to be applied to rotate the flow control element 150 and the accompanying valve to be reliably operated even when high frictional forces are present.

Figure 10A:
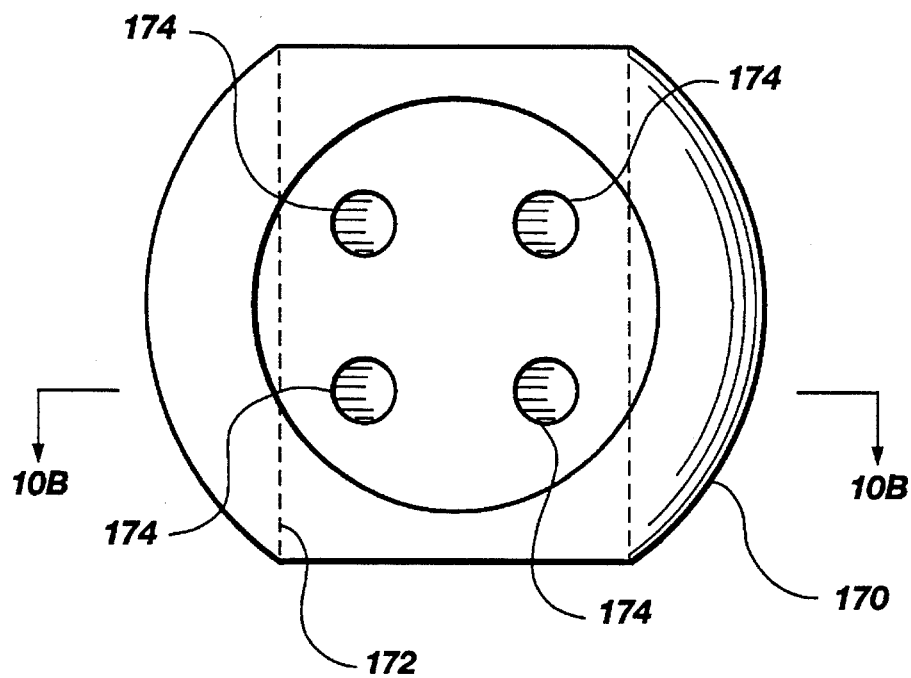
FIGS. 10A and 10B are top and cross sectional views, respectively, of another presently preferred flow control element of the present invention.
Figure 10B:
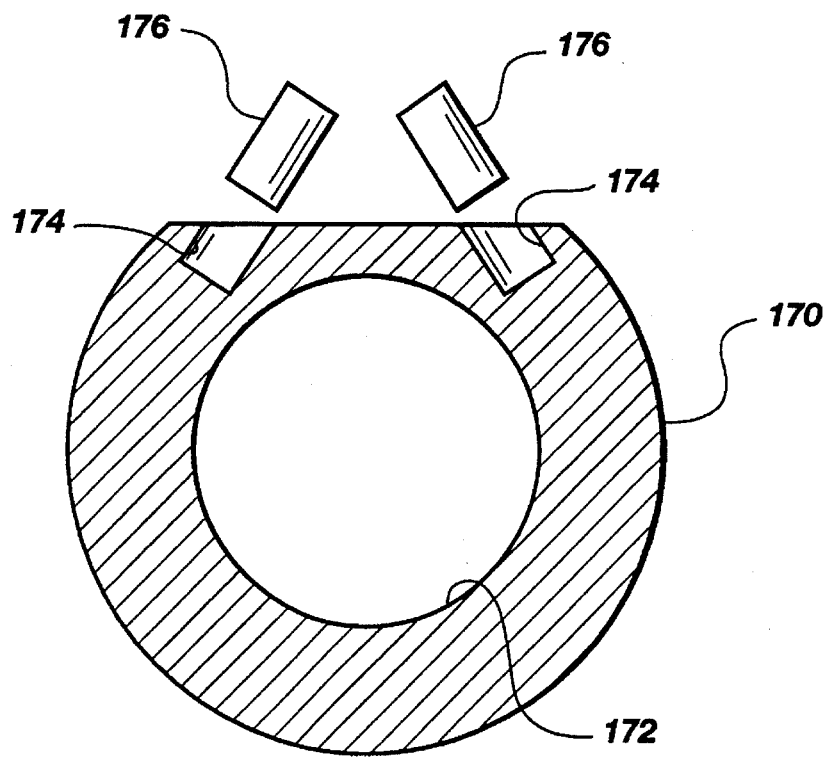

FIGS. 10A–B illustrate another flow control element 170 in accordance with the present invention. The embodiment represented in FIGS. 10A–B is substantially similar to that illustrated in FIGS. 9A–B and includes a passageway 172 and sockets 174. The fingers 176 are not, however, provided with any threaded structure such as threaded portion 156A. Thus, a coupling plate (not illustrated in FIGS. 10A–B) or equivalent structure can be provided with a cage or similar structure to hold the fingers 176 captive and in place. Alternatively, the fingers 176 can be pressed or swaged into a plate.

Figure 11A:
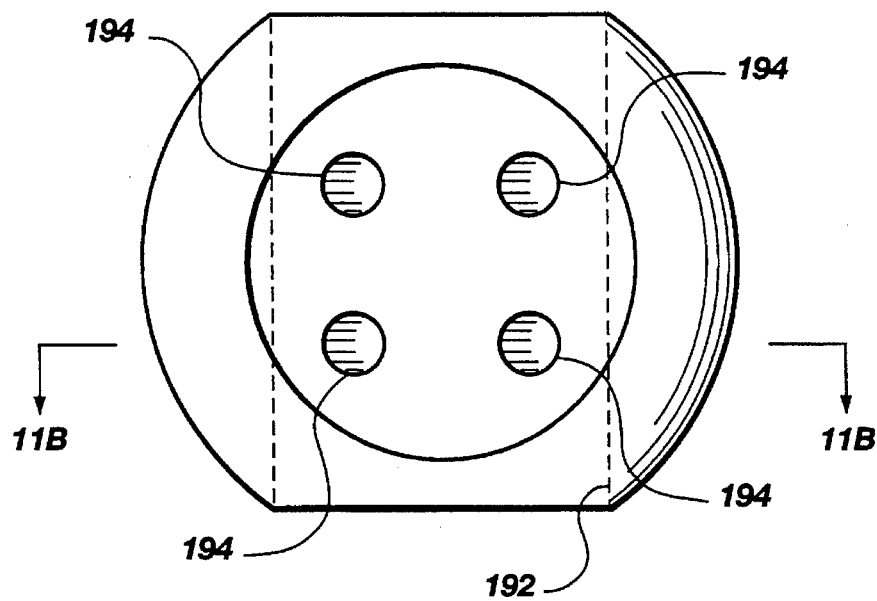
FIGS. 11A and 11B are top and cross sectional views, respectively, of another presently preferred flow control element of the present invention.
Figure 11B:
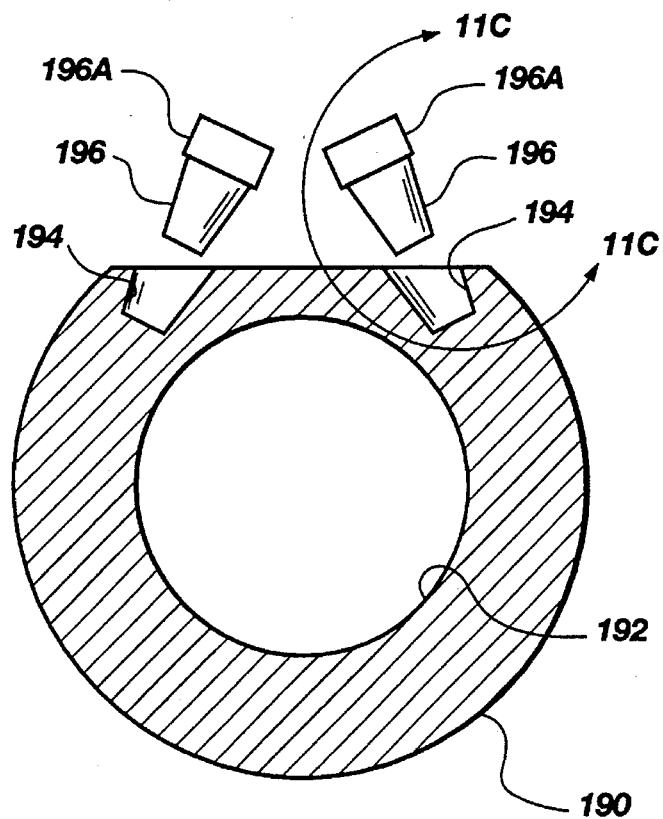

FIGS. 11A–B provide top and cross sectional views, respectively, of another flow control element coupling of the present invention. The embodiment represented in FIGS. 11A–B is substantially similar to that illustrated in FIGS. 9A–B with differences as will be explained. A flow control element 190 includes a passageway 192 and sockets 194. The sockets 194 are provided with nonparallel walls as will be explained in connection with FIG. 11C. The fingers 196 are provided with a threaded portion 196A and are shown in position ready to be inserted into the sockets 194.

Figure 11C:
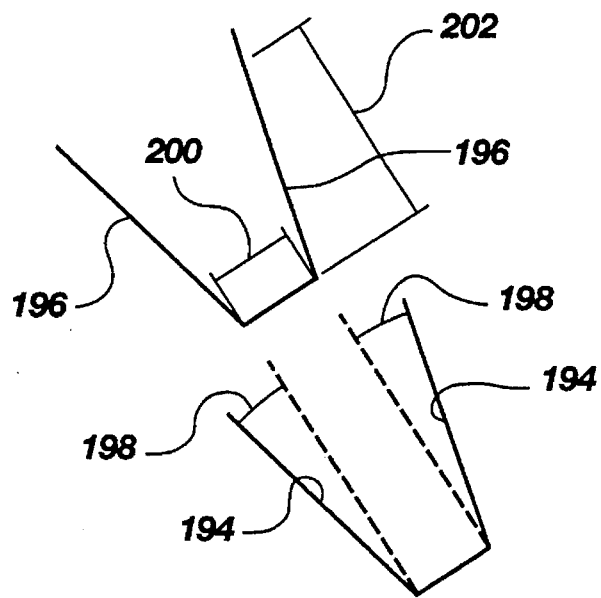

FIG. 11C is a cross sectional view of one of the sockets 194 and finger 196 showing the tapered arrangement of the socket wall and corresponding taper of the finger 196. While those skilled in the art can arrive at numerous different dimensions for the finger 196 and the socket 194 using the information provided herein, in one preferred arrangement the finger 196 is provided with a diameter 200 at its bottom end of 0.38 inches with the socket 194 being formed to have the finger 196 completely inserted into the socket 194 to a depth of 0.355 as represented at 202.

The angle or taper of the socket wall and finger side is represented by angle 198. With the finger 196 and socket 194 having the exemplary dimensions just described, it is most preferred that the angle 198 be about 10°. Angles 198 can be formed anywhere in the range from about 0° to about 20° are preferable, with angles in the range from about 2° to about 20° being more preferred, with either range of angles being used with embodiments of the present invention.

The use of an appropriately tapered finger and socket results in significantly lower contact stresses in the flow control element 190, which is particularly important when a ceramic material is used. By reducing contact stress the flow control element 190 is able to withstand higher torsional force thereby increasing the maximum torque which can be transmitted to the flow control element 190.

Figure 12:
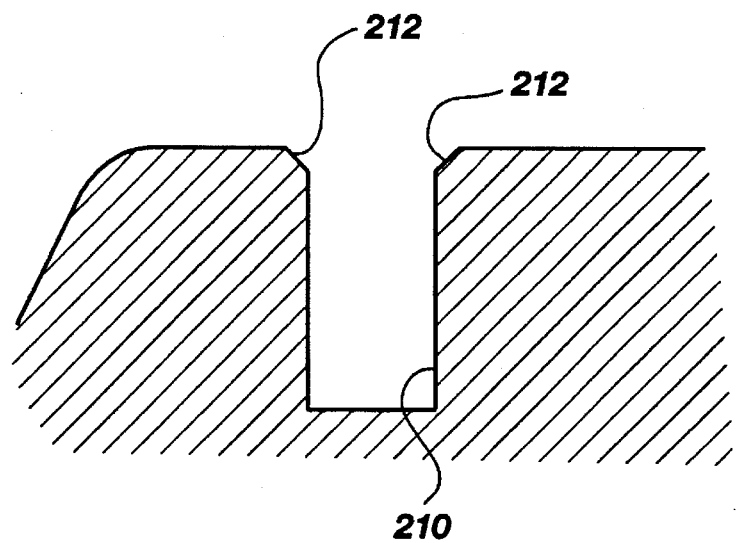
FIG. 12 is a detailed cross sectional view of some of the sockets provided in the flow control element.

Reference will next be made to FIG. 12 which is a cross sectional view of a socket 210 in a flow control element (not illustrated in FIG. 12) such as those previously described. Represented in FIG. 12 is a lip 212 of the socket 210. It is preferred that the lip 212 be chamfered. Chamfering the lip 212 reduces the likelihood of fractures occurring on the surface of the flow control element due to tensile stress.

Figure 13A:
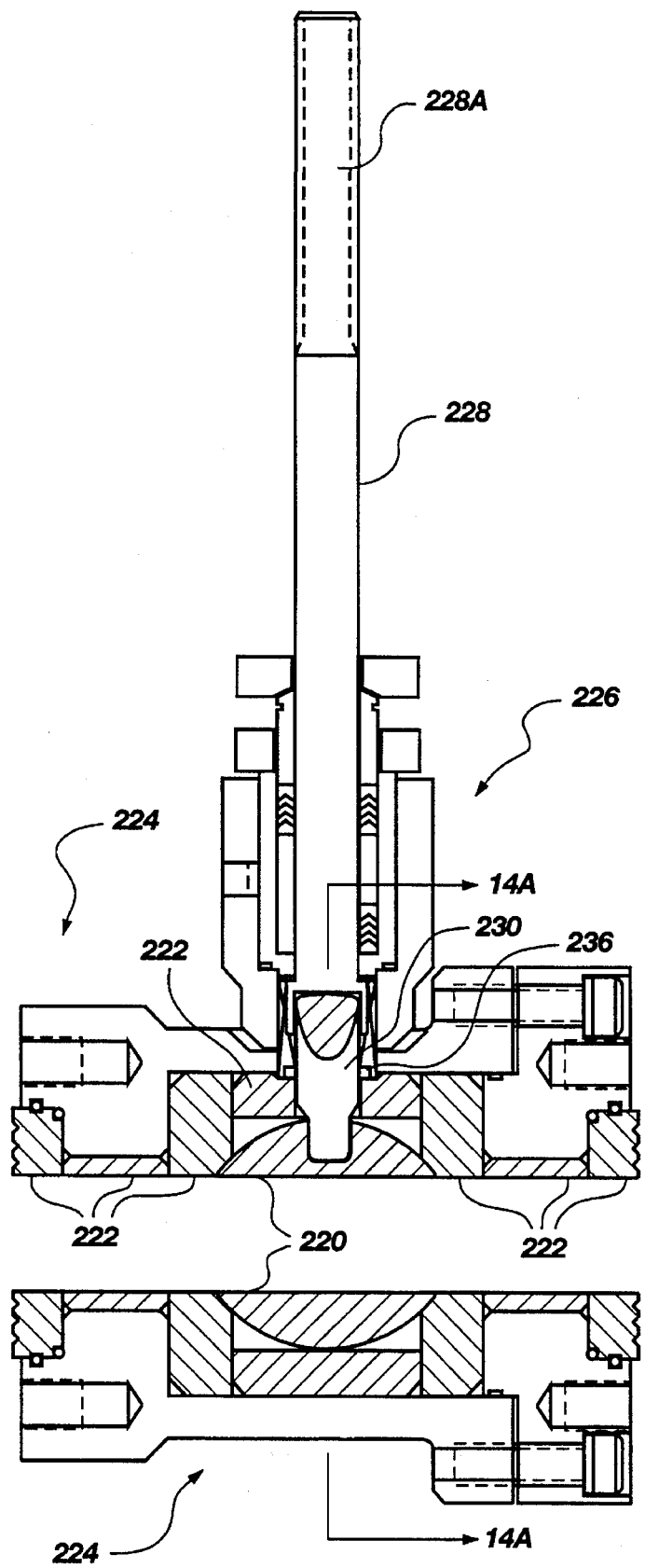
FIG. 13A is a longitudinal cross sectional view of another valve utilizing a non-metallic stem in accordance with the principles of the present invention.
Figure 13B:
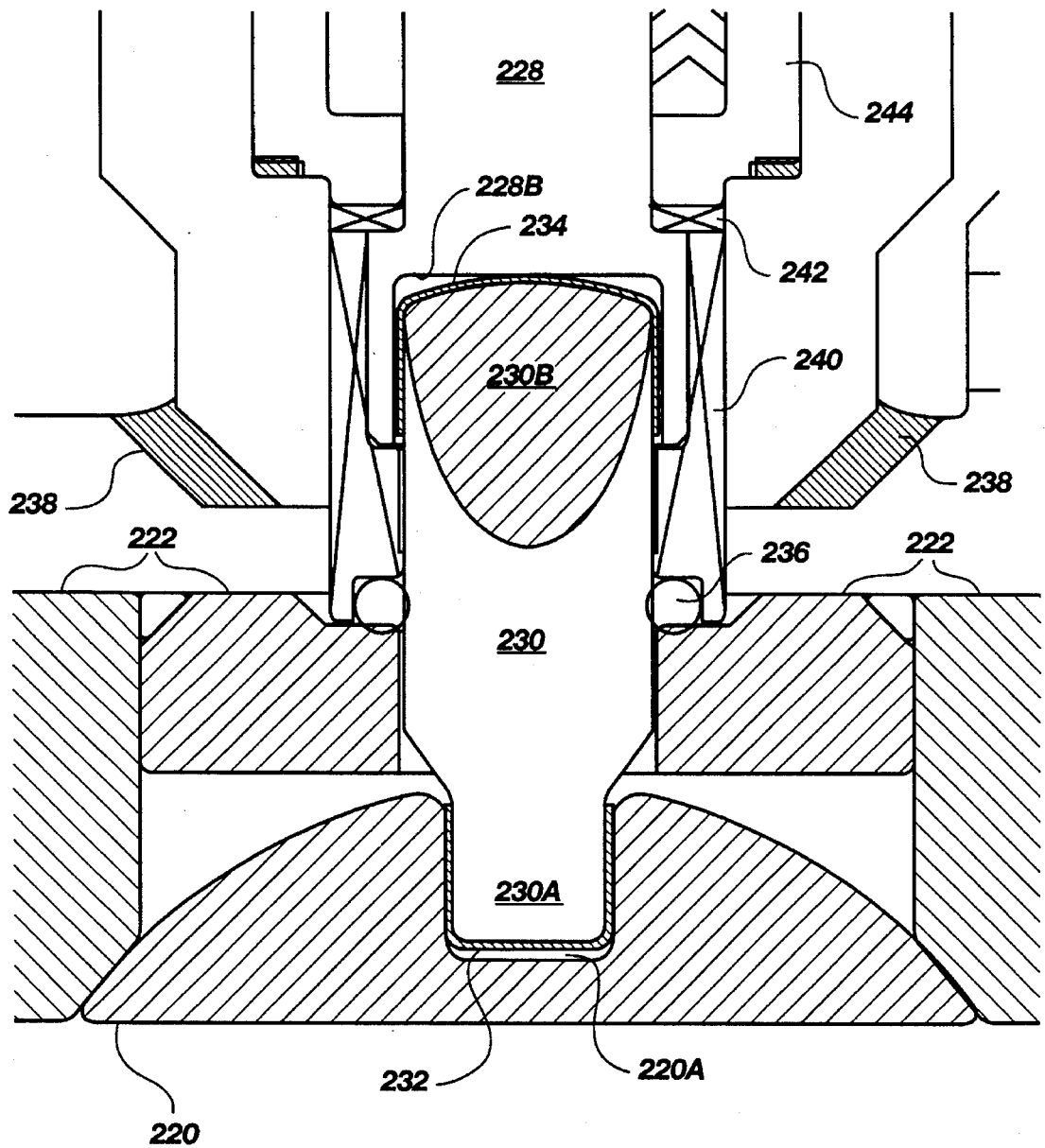
FIG. 13B is a detailed view of a portion of FIG. 13A.
Figure 14A:
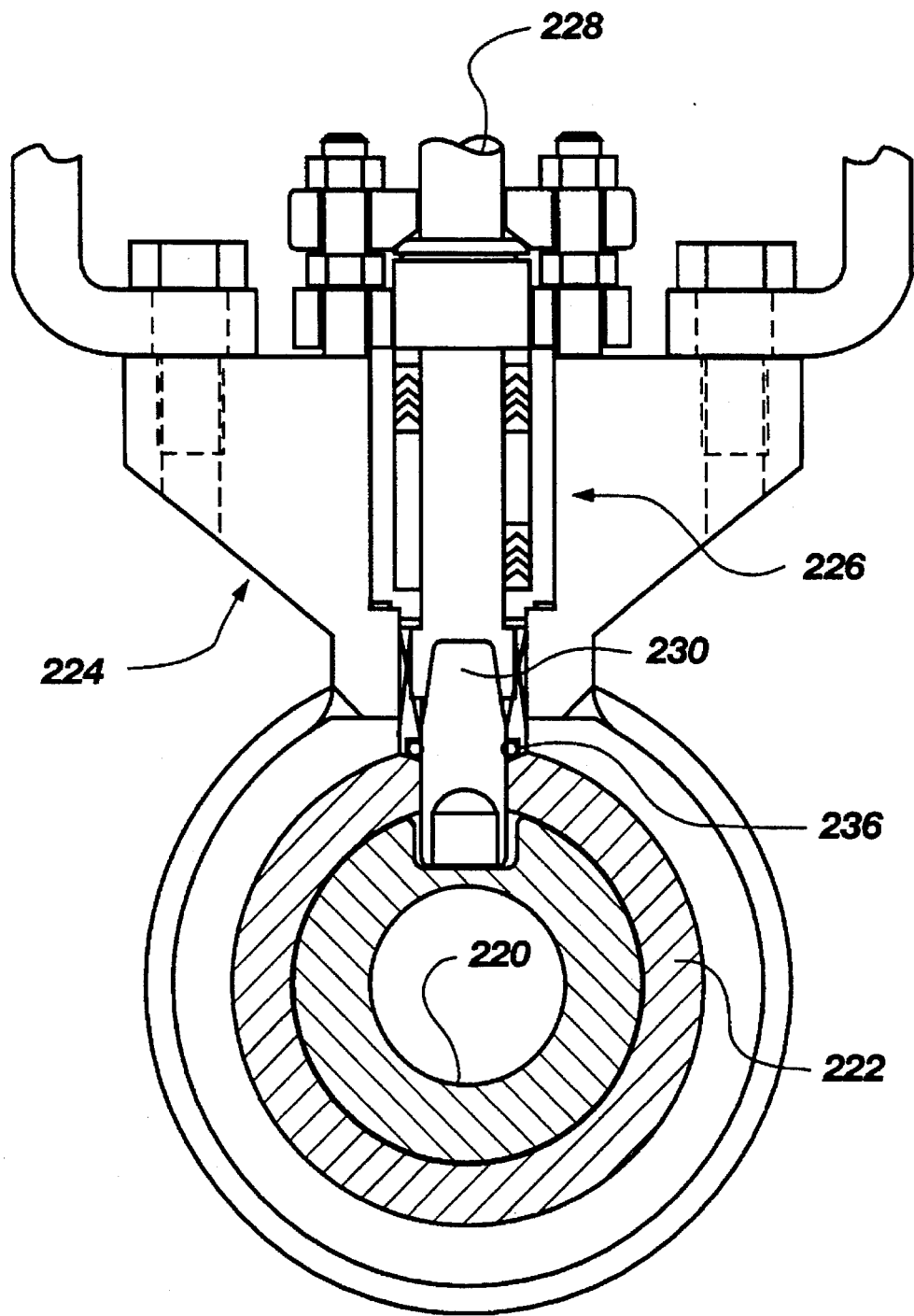
FIG. 14A is an axial cross sectional view of the valve taken along line 14A—14A in FIG. 13A.
Figure 14B:
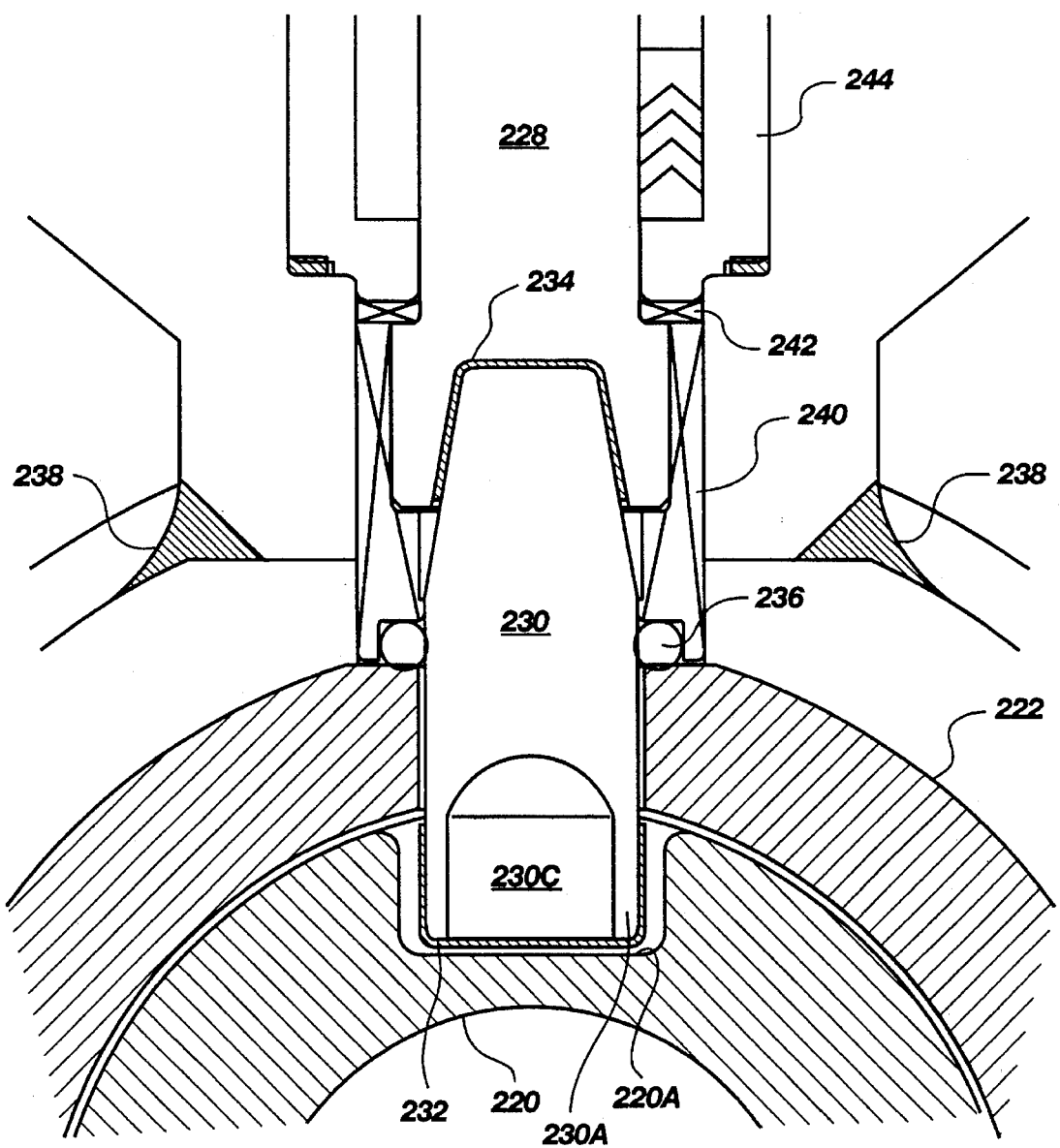
FIG. 14B is a detailed view of a portion of FIG. 14A.

Reference will next be made to FIGS. 13A–B and 14A–B which are cross sectional views of a preferred valve fabricated in accordance with another aspect of the present invention. FIGS. 13A–B are longitudinal cross sectional views while FIGS. 14A–B are axial cross sectional views as if looking through the valve in the direction of the fluid flow. The valve is shown in its open configuration in both FIGS. 13A–B and FIGS. 14A–B.

The embodiment illustrated in FIGS. 13A–B and 14A–B includes a nonmetallic stem extension, preferably fabricated from a ceramic material, which is located in an area where it may come into contact with erosive or corrosive fluid flowing through the valve. The metallic stem is thus prevented from coming into contact with the fluid flowing through the valve.

As represented in FIGS. 13A–B and 14A–B, a flow control element 220 is represented which includes a fluid passageway therethrough. Those additional valve components which are wetted by the fluid are fabricated from a nonmetallic, preferably ceramic, material and are represented as wetted components 222 in FIGS. 13A–B and 14A–B. A plurality of valve housing components, which can be fabricated by those skilled in the art, are represented generally at 224.

A metallic valve stem 228 is shown having an upper stem (228A in FIG. 13A) which is shaped to allow a handle or other device to be attached thereto. A valve stem packing assembly is generally represented at 226 (FIGS. 13A and 14A). The metallic stem 228 extends downward into the valve stem packing assembly 226 but does not reach the flow control element 220 where the metallic stem 228 could come into contact with the erosive or corrosive fluid passing through the valve. A nonmetallic stem extension 230 is provided to couple the metallic stem 230 to the flow control element 220. The nonmetallic stem extension 230 is preferably fabricated from a ceramic material as can be selected by those skilled in the art.

As shown best in the detailed longitudinal cross sectional view of FIG. 13B, a recess 228B is provided on the lower end of the metallic stem 228 into which the nonmetallic stem extension 230 is received so that as the metallic stem 228 is rotated the nonmetallic stem extension 230 also rotates. The recess 228B is preferably shaped as a slot with the respective portion of the nonmetallic stem extension 230 having a corresponding shape. Other shapes can also be used within the scope of the present invention. A tapered face 230B is illustrated on the nonmetallic stem extension 230 which accomplishes the transition to a cylindrical shape which is required in the middle portion of the nonmetallic stem extension to allow rotation thereof. A cushion 234 is interposed between the nonmetallic stem extension 230 and the metallic stem 228.

Still referring primarily to FIG. 13B, the nonmetallic stem extension 230 is provided with a protrusion 230A on its lower end. The protrusion 230A is shaped to be received into a slot 220A provided in the flow control element 220. A cushion 232 is interposed between the slot 220A and the protrusion 230A. The cushion 232 is also illustrated in FIG. 14B. A transition 230C is represented in FIG. 14B which accomplishes the change between the shape of the protrusion 230A and the cylindrical shape of the middle portion of the nonmetallic stem extension 230.

Also represented best in FIGS. 13B and 14B is an O ring 236 which holds the nonmetallic stem extension 230 in place and forms a seal to keep fluid out of the stem packing assembly (226 in FIGS. 13A and 14A). A sleeve 240 compresses the O ring 236 in cooperation with a washer 242 and sleeve 244 by the stem packing assembly (226 in FIGS. 13A and 14A). The stem packing assembly 226 is attached to the valve housing components 224 by way of threads 238.

The components represented in FIGS. 13B and 14B should be dimensioned so that the flow control element 220 can move in reaction to small changes in position of the flow control element 220 without flexing the nonmetallic stem extension 230. It will be appreciated that ceramic materials are not well suited to accommodate flexing movement. The elasticity of the O ring 236 contributes to allowing the nonmetallic stem extension to avoid flexing when the flow control element 220 moves during use.

Moreover, as seen best in FIGS. 13B and 14B, the dimensions of the interengaging components also function to prevent flexing of the nonmetallic stem extension 236. As seen best in FIG. 14B, the dimensions of the slot 220A provided in the flow control element 220 and the protrusion 230A on the nonmetallic stem extension 230 provide a slight gap between the slot 220A and the nonmetallic stem extension 230 so that the flow control element can move in the direction of the fluid flow without imposing flexing movement on the nonmetallic stem extension 230. Similarly, the dimensions of the recess 228B allow the respective portion of the nonmetallic stem extension 230 to move slightly therein when movement perpendicular to the flow of fluid through the valve occurs. Thus, the illustrated structures provide that the coupling between the metallic stem 228 and the flow control element 220 provides a desirable amount of play and provides a more reliable valve.

It will be appreciated that any combination of the above described features may be combined into a single embodiment of the present invention. Moreover, the described embodiments may find use in applications other than those explicitly described herein.

In view of the foregoing, it will be appreciated that the present invention provides a more reliable fluid valve utilizing a non-metallic flow control element which is not prone to breakage and wherein the interface between the wetted non-metallic components and the non-wetted metallic components more reliably transmits the torque applied to operate the valve. The present invention also provides a coupling between the flow control element of a valve and the actuation structures of the valve to avoid breakage, fractures, and deformation of the flow control element. Moreover, the present invention provides that metallic components are kept from contact with any corrosive or erosive fluid passing through the valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A coupling for use in a fluid control valve having a flow control element which controls the flow of fluid through the valve by rotation of the flow control element about an axis, the flow control element having a perimeter, the valve further comprising a shaft which is acted upon to cause rotation of the flow control element, the coupling comprising:

first socket means, formed in the flow control element, for receiving a corresponding first finger means for conveying torque which is applied to the shaft, the first finger means being received into the first socket means; and second socket means, formed in the flow control element, for receiving a corresponding second finger means for conveying torque which is applied to the shaft, the second finger means being received into the second socket means;

wherein the first socket means and second socket means are each formed in the flow control element so as to be oriented at one or more nonparallel angles in relation to the axis of the flow control element such that as torque is applied to the shaft the flow control element is caused to rotate.

2. A coupling for use in a fluid control valve as defined in claim 1 wherein the first and second socket means each has a top and a bottom wherein each of the tops are closer to the axis than the bottom of the same socket means.

3. A coupling for use in a fluid control valve as defined in claim 1 wherein the nonparallel angles are in the range from about 2° to about 20°.

4. A coupling for use in a fluid control valve as defined in claim 1 wherein the first and second socket means are each positioned not closer to the axis than thirty percent of distance from the axis to the perimeter of the fluid control element.

5. A coupling for use in a fluid control valve as defined in claim 1 further comprising a means for cushioning interposed between the each of the socket means and the finger means.

6. A coupling for use in a fluid control valve as defined in claim 1 wherein the flow control element comprises a generally spherical ball having a passageway therethrough.

7. A coupling for use in a fluid control valve as defined in claim 1 wherein the finger means each comprise metallic protrusions and the socket means each comprise depressions.

8. A coupling for use in a fluid control valve as defined in claim 1 wherein the flow control element comprises a ceramic fluid control element and wherein the shaft comprises a metallic shaft.

9. A coupling for use in a fluid control valve as defined in claim 1 wherein the socket means each comprise a chamfered opening.

10. A valve comprising:

a valve body;

an actuator shaft held within the valve body;

a flow control element rotatably held within the valve body, the flow control element having at least a first position wherein the flow through the valve is stopped and a second position wherein flow through the valve is allowed, the flow control element having a central axis and an outer perimeter;

at least four sockets asymmetrically positioned on the surface of the flow control element about the central axis and each of the sockets being tapered and oriented at a nonparallel angle in relation to the central axis; and a plurality of fingers held in a fixed relationship with the shaft, the fingers complementary in shape to the sockets formed on the flow control element and such that the fingers engage corresponding sockets so that as the shaft is rotated the flow control element rotates within the valve body.

* * * * *